United States Patent [19]

Inoue

[11] Patent Number: 5,963,979
[45] Date of Patent: *Oct. 5, 1999

[54] SYSTEM FOR UPDATING INACTIVE SYSTEM MEMORY USING DUAL PORT MEMORY

[75] Inventor: Haruko Inoue, Tokyo, Japan

[73] Assignee: NEC Corporation, Tokyo, Japan

[*] Notice: This patent is subject to a terminal disclaimer.

[21] Appl. No.: 08/851,958

[22] Filed: May 6, 1997

Related U.S. Application Data

[63] Continuation of application No. 08/409,082, Mar. 22, 1995, Pat. No. 5,682,518.

[30] Foreign Application Priority Data

Mar. 28, 1994 [JP] Japan ................................. 5-079315

[51] Int. Cl.⁶ ........................... G06F 12/16; G06F 11/20
[52] U.S. Cl. ...................... 711/162; 711/149; 711/154; 714/11; 714/6
[58] Field of Search .................... 711/149, 162, 711/154; 395/182.08, 182.09, 182.07; 714/10, 9, 6, 11

[56] References Cited

U.S. PATENT DOCUMENTS

| | | | |
|---|---|---|---|
| 4,610,013 | 9/1986 | Long et al. ............................... | 714/55 |
| 4,823,256 | 4/1989 | Bishop et al. ........................... | 364/187 |
| 4,958,273 | 9/1990 | Anderson et al. ................... | 395/800.29 |
| 4,999,768 | 3/1991 | Hirokawa ............................ | 395/200.43 |
| 5,099,485 | 3/1992 | Bruckert et al. .......................... | 714/11 |
| 5,121,485 | 6/1992 | Ujiie ....................................... | 711/119 |
| 5,202,980 | 4/1993 | Morita et al. ............................. | 714/11 |
| 5,276,842 | 1/1994 | Sugita .................................... | 711/149 |
| 5,307,471 | 4/1994 | Ishikawa ................................ | 710/100 |
| 5,341,473 | 8/1994 | Takayama .......................... | 395/200.08 |
| 5,418,938 | 5/1995 | Hatanaka et al. .......................... | 714/6 |
| 5,434,998 | 7/1995 | Akai et al. .............................. | 709/213 |
| 5,455,932 | 10/1995 | Major et al. ........................... | 711/162 |

Primary Examiner—Eddie P. Chan
Assistant Examiner—Hong Kim
Attorney, Agent, or Firm—Whitham, Curtis & Whitham

[57] ABSTRACT

A system for updating an inactive system memory includes a first package set in an active state and having a first processor and a second package set in an inactive state and having a second processor. The first package includes a first buffer memory, a first write control unit for outputting a write control signal and an address signal to the first buffer memory in accordance with a write control signal output from the first processor to the first memory, and a first holding unit for holding update data and an address signal output from the first processor to the first memory, and outputting held contents as data of the first buffer memory in accordance with a write control signal output from the first write control unit to the first buffer memory. The second package has the same arrangement as the first package. The second processor in an inactive state updates the second memory in accordance with update data and address data set for the first memory and stored in the first buffer memory.

11 Claims, 3 Drawing Sheets

SYSTEM FOR UPDATING INACTIVE SYSTEM MEMORY USING DUAL PORT MEMORY

CROSS REFERENCE TO RELATED APLICATION

This application is a continuation of application Ser. No. 08/409,082, filed Mar. 22, 1995, U.S. Pat. No. 5,682,518.

BACKGROUND OF THE INVENTION

The present invention relates to a system for updating an inactive system memory in a duplex processing apparatus having duplexed packages, each incorporating a microprocessors.

A duplex processing apparatus is known in which, to improve the reliability of a system to which the apparatus is applied, two packages, each incorporating a microprocessor and having a data processing function, are duplexed. Such a duplex processing apparatus has two identical packages. With this arrangement, even if one package is stopped because of a failure or the like, the other package takes over the processing. Therefore, the overall function is not easily corrupted and a highly reliable apparatus can be realized. In an apparatus having packages duplexed, the contents of a memory of an active system package must be identical to those of a memory of an inactive system package.

FIG. 3 shows the arrangement of an information processing apparatus in which packages are duplexed in this manner. Referring to FIG. 3, reference numeral 21 denotes a CPU (Central Processing Unit), of a package A, which is a microprocessor; 22, a CPU of a package B, which is a microprocessor; 23, a memory connected to the CPU 21; 24, a memory connected to the CPU 22; 25, a buffer of the package A, which is connected between the CPU 21 and the package B; 26, a buffer of the package B, which is connected between the CPU 22 and the package A; 27, a selection circuit of the package A, which serves to select the CPU 21 or the buffer 26; and 28, a selection circuit of the package B, which serves to select the CPU 22 or the buffer 25.

The CPUs 21 and 22 and the buffers 25 and 26 are connected to each other via data buses 31, address busses 32, and control buses 33. The CPUs 21 and 22 and the memories 23 and 24 are also connected through the selection circuits 27 and 28 via the above buses. The buffer 25 and the selection circuit 28 of the package B are connected to each other via the data bus 31, the data bus 32, and the control bus 33, so are the buffer 26 and the selection circuit 27 of the package A. That is, the selection circuit 28 receives data and control signals from the CPUs 21 and 22.

The selection circuits 27 and 28 connect the memory 23 to one of the CPUs 21 and 22 which is in an active state in accordance with a monitor signal indicating which specific one of the CPUs 21 and 22 is in an active state. If, for example, the package A is in an active state, the CPU 21 is ready to perform processing. Therefore, the selection circuit 27 connects the memory 23 to the CPU 21, and the selection circuit 28 of the package B connects the memory 24 to the CPU 21 via the buffer 25. With this connection, the CPU 21 can update identical data in the memories 23 and 24 so that the memories 23 and 24 always hold the same contents.

In the conventional duplex processing apparatus having the above arrangement, since the CPU 21 in an active state must perform update processing of data in the memory 24 as well as update processing of data in the memory 23, the load on the CPU 21 is heavy.

SUMMARY OF THE INVENTION

It is an object of the present invention to provide a system for updating an inactive system memory, which can update the contents of a memory of an inactive package without imposing a heavy load on a microprocessor of an active package.

In order to achieve the above object, according to the present invention, there is provided a system for updating an inactive system memory, comprising a first package set in an active state and having a first processor and a first memory from/in which data is read/written in accordance with address, read control, and write control signals output from the first processor, and a second package set in an inactive state and having a second processor for backing up the first processor and a second memory in which data identical to data in the first memory is stored and from/in which data is read/written in accordance with address, read control, and write control signals output from the second processor. The first package includes a first buffer memory, first write control means for outputting a write control signal and an address signal to the first buffer memory in accordance with the write control signal output from the first processor to the first memory, and first holding means for holding update data and the address signal output from the first processor to the first memory, and outputting held contents as data of the first buffer memory in accordance with the write control signal output from the first write control means to the first buffer memory. The second package includes a second buffer memory, second write control means for outputting a write control signal and an address signal to the second buffer memory in accordance with the write control signal output from the second processor to the second memory, and second holding means for holding update data and the address signal output from the second processor to the second memory, and outputting held contents as data of the second buffer memory in accordance with the write control signal output from the second write control means to the second buffer memory, wherein the second processor in an inactive state updates the second memory in accordance with the update data and address data set for the first memory and stored in the first buffer memory.

BRIEF DESCRIPTION OF THE DRAWINGS

FIGS. 2A to 2F are timing charts showing a write operation with respect to a dual-port memory in FIG. 1.

DESCRIPTION OF THE PREFERRED EMBODIMENT

Figure 1:
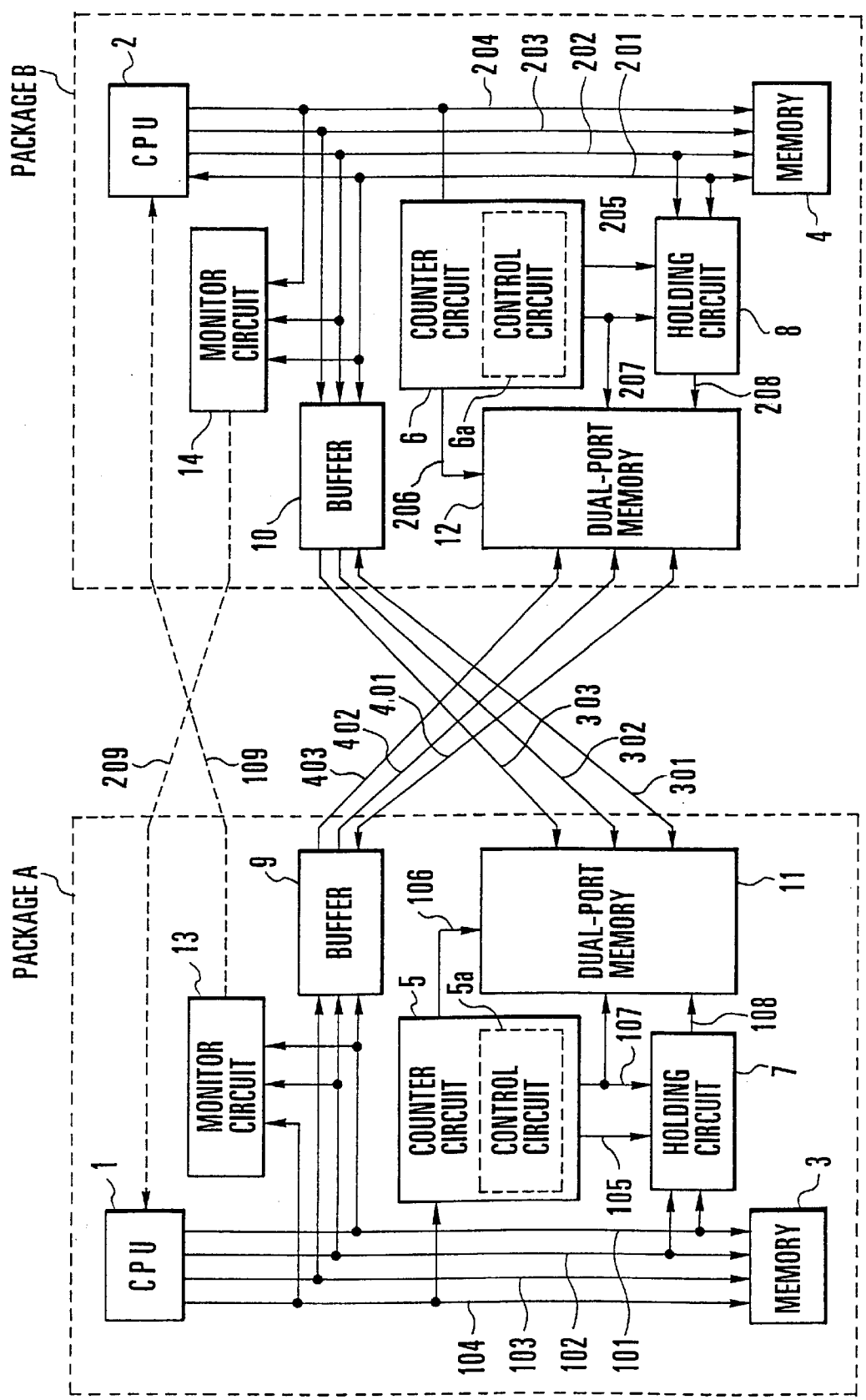
FIG. 1 is a block diagram showing the arrangement of a system for updating an inactive system memory in a duplex processing apparatus according to an embodiment of the present invention.
Figure 3:
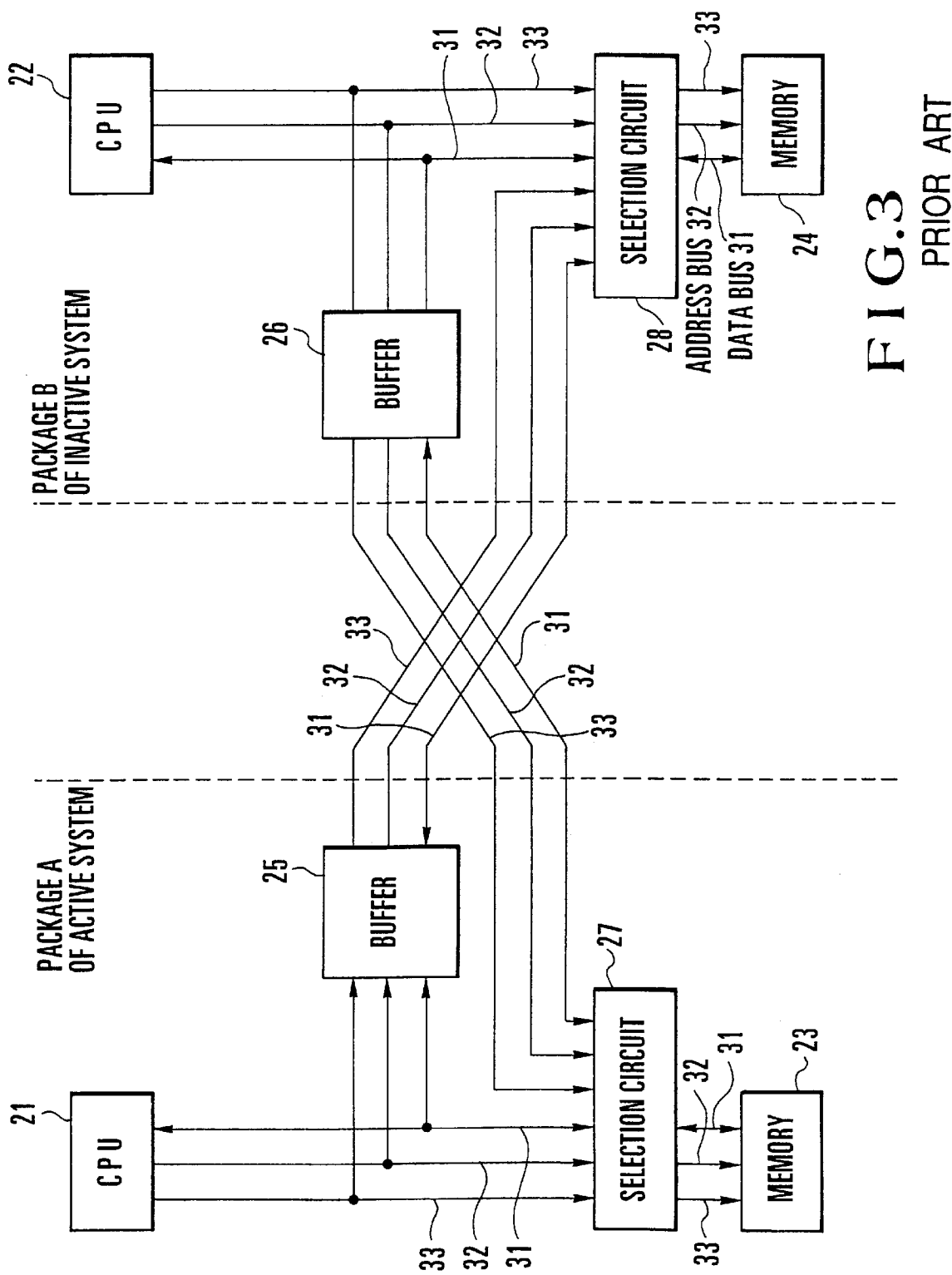
FIG. 3 is a block diagram showing the arrangement of a conventional duplex processing apparatus.

An embodiment of the present invention will be described below with reference to the accompanying drawings. FIG. 1 shows the arrangement of a system for updating an inactive system memory according to the present invention.

Referring to FIG. 1, reference numeral 1 denotes a CPU of a package A, which is a processor; 2, a CPU of a package B, which is a processor; 3, a memory of the package A, which is connected to the CPU 1; 4, a memory of the package B, which is connected to the CPU 2; 5, a counter circuit, of the package A, which is connected to the CPU 1 via a write control bus 104; 6, a counter circuit of the package B, which is connected to the CPU 2 via a write control bus 204; 7, a holding circuit of the package A, which is connected to the CPU 1 via an address bus 102 and a data bus 101; 8, a holding circuit of the package B, which is connected to the CPU 2 via a data bus 201 and an address bus 202; 9, a buffer of the package A, which is connected to the CPU 1 via an address bus 102, read control bus 103 and the data bus 101; 10, a buffer of the package B, which is connected to the CPU 2 via an address bus 202 and a read control bus 203; 11, a dual-port memory (first buffer memory) of the package A in which output data 108 from the holding circuit 7 is written in accordance with an address signal (count value) 106 and a write control signal 107 from the counter circuit 5; 12, a dual-port memory (second buffer memory) of the package B in which output data 208 from the holding circuit 8 is written in accordance with an address signal (count value) 206 and a write control signal 207 from the counter circuit 6; 13, a monitor circuit of the package A, which is connected to the CPU 1 via a data bus 101, an address bus 102, and a write control bus 104; and 14, a monitor circuit of the package B, which is connected to the CPU 2 via a data bus 201, an address bus 202, and a write control bus 204.

The counter circuits 5 and 6 respectively have control circuits 5a and 6a for outputting latch signals 105 to the holding circuits 7 and 8, and also outputting the write control signals 107 to the holding circuits 7 and 8 and the dual port memories 11 and 12. In addition, the counter circuits 5 and 6 output the address signals 106 and 206 respectively, each consisting of a counter value corresponding to the write control signals 107 and 207, to the dual port memories 11 and 12, respectively.

In response to the latch signals 105 and 205 from the counter circuits 5 and 6, the holding circuits 7 and 8 simultaneously load update data on the data buses 101 and address data on the address buses 102 and 202, respectively. The holding circuit 7 reads out the address data and the update data in this order at the timing designated by the control signal 107 from the counter circuit 5, and outputs the readout data 108 to the dual-port memory 11.

The CPU 1 and the memory 3 are connected to each other via the data bus 101, the address bus 102, the read control bus 103, and the write control bus 104. The CPU 2 and the memory 4 are connected to each other via the data bus 201, the address bus 202, the read control bus 203 and the write control bus 204. The dual-port memory 11 and the buffer 10 are connected to each other via the data bus 301, the address bus 302, and the read control bus 303. The dual-port memory 12 and the buffer 9 are connected to each other via the data bus 401, the address bus 402 and the read control bus 403.

A data update operation in a case wherein the package A is an active state will be described next with reference to the timing charts in FIGS. 2A to 2F. When the memory 3 is to be updated, the CPU 1 of the package A controls data on the data bus 101, the address bus 102, and the write control bus 104 in accordance with contents to be updated. In addition, the CPU 1 writes monitor data at a predetermined monitor address in the memory 3 at a predetermined period.

The control circuit 5a of the counter circuit 5 fetches a write control signal (FIG. 2C), on the write control bus 104, which is supplied from the CPU 1 when it updates the contents of the memory 3, and outputs the latch signal 105 synchronized with the fetched write control signal.

In response to the latch signal 105 from the counter circuit 5, the holding circuit 7 simultaneously holds address data ADD (FIG. 2A) on the address bus 102 and update data DATA (FIG. 2B) on the data bus 101 at the timing of the write control signal (FIG. 2C), and repeats this holding operation for each write control signal on the write control bus 104. Note that the holding circuit 7 reads/writes data according to a first-in first-out scheme. The amount of data held in the holding circuit 7 is set in accordance with the amount of update data.

When no write control signal is output to the write control bus 104, the control circuit 5a of the counter circuit 5 determines that the CPU 1 has completed update processing of the memory 3. Subsequently, the control circuit 5a repeatedly outputs a pair of control signals 107 shown in FIG. 2F to the holding circuit 7 and the dual-port memory 11 in accordance with the amount of data held in the holding circuit 7. In addition, the counter circuit 5 increments the value of the address signal 106 by "1", as shown in FIG. 2D, and outputs the signal to the dual-port memory 11 every time the write control signal 107 is output to the dual-port memory 11.

The holding circuit 7 delimits the contents of held data from the address bus 102 and the data bus 101 for each predetermined data amount, and sequentially selects and outputs the delimited data in accordance with the write control signal 107 output from the counter circuit 5. That is, data held in the holding circuit 7 is read out at the falling edge of the write control signal 107 (FIG. 2F) from the counter circuit 5 and output to the dual-port memory 11, as shown in FIG. 2E.

The dual-port memory 11 stores the data 108, output from the holding circuit 7, at the address designated by the address signal 106 from the counter circuit 5 at the rising edge of the write control signal 107 from the counter circuit 5. That is, the address data ADD is stored at address "n"; and the update data DATA, at address "n+1". Subsequently, the write control signal 107 and the address signal 106 are repeatedly output from the counter circuit 5, so that update data identical to the update data in the memory 3 is stored in the dual-port memory 11.

Monitor data for a check and a monitor address are stored in the monitor circuit 13 in advance. The monitor circuit 13 monitors runaway of the CPU 1 by checking whether monitor data and a monitor address output from the CPU 1 at a predetermined period coincide with the stored data. The monitor circuit 13 detects runaway of the CPU 1 when the above data do not coincide with each other. The monitor circuit 13 then notifies this state to the CPU 2 of the package B in an inactive data via a notification line 109. Note that the monitor circuit 13 may check monitor data read out from the memory 3 by the CPU 1 instead of checking monitor data written in the memory 3 by the CPU 1.

While the CPU 2 of the package B receives a notification indicating the normal state of the CPU 1 from the monitor circuit 13 of the package A, the CPU 2 constantly checks the contents of the dual-port memory 11 of the package A via the buffer 10, the data bus 301, the address bus 302, and the read control bus 303. That is, read control of the dual-port memory 11, including read address control, is performed by the CPU 2. If data stored in the memory 4 at an address identical to an address read out from the dual-port memory 11 does not coincide with data read out from the dual-port memory 11, the CPU 2 determines that the memory 3 is updated. Upon determining that the memory 3 is updated, the CPU 2 writes the readout update data in the memory 4 at an address identical to the readout address data, thereby updating the memory 4 to have the same contents as those of the memory 3. Note that since the dual-port memory 11 is capable of simultaneous data write and read operations, the memory 4 can be updated while update data or the like is written in the dual-port memory 11.

In contrast to this, if the CPU 2 of the package B receives a notification indicating runaway of the CPU 1 from the monitor circuit 13 of the package A via the notification line 109, the CPU 2 does not update the memory 4 in accordance with the contents of the dual-port memory 11.

If some addresses of the memory 3 are designated in updating the memory 3, only data corresponding to the update portions are stored in the dual-port memory 11. In contrast to this, if data are to be overwritten at all the addresses of the memory 3, including addresses at which no data are to be updated, the contents of the dual-port memory 11 become identical to those of the memory 3, and the CPU 2 updates only necessary addresses of the memory 4.

In the above embodiment, read control of the holding circuit 7 is performed by using the write control signal 107 for the dual-port memory 11 as a read control signal. However, a read control signal dedicated to the holding circuit 7 may be output from the control circuit 5a of the counter circuit 5 independently of the write control signal 107.

Furthermore, according to the above description, the dual-port memory 11 having one input port is used. However, a multi-port memory having two input ports may be used, and address data and update data simultaneously output from the holding circuit 7 may be separately supplied to the two input ports of the multi-port memory.

As has been described above, according to the present invention, in the first package in an active state, when the first memory is to be updated by the first microprocessor, the update contents are stored in the first buffer memory as well as in the first memory. The second microprocessor of the second package in an inactive state reads out the contents of the first buffer memory and writes the contents in the second memory of the second package in the inactive state. Therefore, no processing load is imposed on the first microprocessor of the first package in the active state.

In addition, the second microprocessor of the second package in the inactive state can recognize runaway of the first microprocessor of the first package. This prevents update processing of erroneous memory contents based on runaway of the microprocessor of the first package.

Furthermore, since a dual-port memory is used as a buffer memory, the second microprocessor can update the second memory at the same time while the first microprocessor updates the first memory.

What is claimed is:

1. A system for updating an inactive memory, comprising:
    a first package including:
        a first processor having means for generating and outputting a sequence of first address signals, a sequence of first update data corresponding to said sequence of first address signals, a first read control signal, and a first write control signal;
        a first memory for read/write of first update data from said sequence of first update data in accordance with first address/signals from said sequence of first address signals, said first read control signal and said first write control signal;
        a first dual port buffer memory having an input port for receiving a first data sequence, for storing the received first data sequence in accordance with the first address signal, and having an output port for outputting the stored received first data sequence in response to an access request;
        first write control means for generating and outputting a second write control signal and a second address signal in accordance with said first write control signal; and
        first holding means for holding said sequence of first update data and said sequence of first address signals, and for outputting the held sequences as said first data sequence to said first dual port buffer memory, in accordance with said second write control signal; and
    a second package including:
        a second processor having means for generating and outputting a sequence of third address signals, a second read control signal, a sequence of second update data corresponding to said sequence of third address signals, and a third write control signal;
        a second memory for read/write of second update data from said sequence of second update data in accordance with third address signals from said sequence of third address signals, said second read control signal and said third write control signal;
        a second dual port buffer memory for receiving and storing a second data sequence;
        second write control means for generating and outputting a fourth write control signal and a fourth address signal in accordance with said the third write control signal; and
        second holding means for holding said sequence of second update data and said sequence of third address signals output from said second processor to said second memory, and for outputting the held sequences as said second data sequence to said second dual port buffer memory, in accordance with said fourth write control signal,
        wherein said second processor has means for accessing said first dual port buffer memory by transmitting said access request to the first dual port buffer memory, and has means for updating said second memory to correspond to the sequence of first update data and corresponding sequence of first address data received from said first dual port buffer memory in response to said access request.

2. A system according to claim 1, further comprising an input/output buffer connected between said first dual port buffer memory of said first package and said second processor for reading the sequence of first update data and the corresponding sequence of first address data output from said first holding means and stored in said first dual port buffer memory.

3. A system according to claim 1, wherein said first write control circuit includes a first counter circuit and said second write control circuit includes a second counter circuit for outputting said second and fourth address signals, respectively, each of said first and second counter circuit having means for generating a count value, in accordance with said first and second update data, respectively, and said first and second address signals from said first and second holding means, respectively, and each of said first and second counter circuit having a corresponding control circuit for outputting said second and fourth write control signals, respectively, in accordance with said second and fourth address signals output from said counter circuits.

4. A system according to claim 3, wherein said first holding means holds a first update data and a first address signal of said sequence of first update data and corresponding sequence of first address signals every time said first write control signal is output from said first processor to said first memory, and further comprises means for indicating an amount of the first update data and first address signal held in said first holding means and wherein the indicated amount of the held sequence of first update data and sequence of first write address signal are sequentially read out at a timing based on said second write control signal from said first write control circuit.

5. A system according to claim 1, wherein said first package comprises first monitor means for monitoring a failure of said first processor, said second package comprises second monitor means for monitoring a failure of said second processor, and said second processor stops an update operation with respect to said second memory based on contents of said first buffer memory upon receiving a notification indicating failure of said first processor from said first monitor means.

6. A system for updating an inactive system memory, comprising two packages set in a complementary manner in active and inactive states, each of said packages comprising:

a processor memory in which data is stored;

a processor for reading/writing data into/from said processor memory by outputting a sequence of first address signals, a sequence of update data corresponding to said sequence of first address signals, and first read/write control signals;

write control means for outputting a second address signal and a second write control when the first write control signal is output from said processor;

holding means for holding said sequence of update data and the sequence of first address signals output from said processor to said processor memory and for outputting a data sequence comprising the held sequence of update data and sequence of first address signals in accordance with the second write control signal output from said write control means; and a dual port buffer memory for storing the data sequence comprising the sequence of update data and the sequence of first address signals output from said holding means in accordance with the second address signal and second write control signal, wherein the processor of a first one of said packages set in an active state updates the processor memory of said active package by writing the sequence of update data into the processor memory in accordance the corresponding sequence of first address signals and read/write control signals, and wherein the processor of a second one of said packages set in an inactive state has means for updating the processor memory of said inactive package in accordance with the data sequence comprising the sequence of update data and the sequence of first address signals stored in said buffer memory of said active package, by reading the data sequence out of said dual port buffer memory of said active package.

7. A system according to claim 6, wherein said first one of said packages further comprises a first buffer connected to a dual port buffer memory of said second one of said packages, said second one of said packages further comprises a second buffer memory connected to said dual port buffer memory of said first one of said packages, and said second processor reads out, via said second buffer, the update data and address data set for said processor memory and stored in said dual port buffer memory.

8. A system according to claim 6, wherein said write control means circuit includes a counter for counting, and generating a corresponding counter value, of a sequence of said first write control signals, means for decrementing the counter value and outputting said second address signal and said second write control signal based on said decremented counter value.

9. A system according to claim 8, further comprising:

means for detecting an amount of first update data and first address signals held in said first holding means; and means for sequentially reading out said held first update data and held first address signals at a timing based on said second write control signal and said second address and based on said detected amount.

10. A system according to claim 6, further comprising a monitor means for monitoring a failure of said processor of said first one of said packages, and means for outputting a failure signal in response, and wherein said processor of said second one of said packages includes means for disabling its reading of the first dual port buffer memory of the first one of said packages in response to receiving said failure signal.

11. A dual processor system comprising:

a first processor having means for generating a sequence of first data, a sequence of first address signals, and a first write control signal, a first memory, connected to said first processor, for retrievably storing first data from said sequence of first data in accordance with first address signals from said sequence of first address signals;

write control means for determining a termination of the first write control signal;

a first holding means, connected to said first processor, for holding said sequence of the first data and sequence of first address signals in accordance with the first write control signal, and for outputting a data sequence comprising said sequence of first data and sequence of first address signals in accordance with said termination of the first write control signal;

a dual port buffer memory means for storing the output data sequence of the first data and first address signal, said dual port buffer memory means having an input port, an output port and means for simultaneous addressable writing of data into said input port and addressable reading of data from said output port, respectively;

a second processor having means for generating a second data and a second address signal and means for addressably reading data from the output port of said dual port buffer memory means; and a second memory, connected to said second processor, for retrievably storing said second data in accordance with said second address signal, wherein said second processor includes means for comparing a first data from said output sequence of first data and first address signals read from the output port of the dual port buffer memory means with a data read from the second memory and for writing the first data to said second memory based on said comparing.

* * * * *